United States Patent [19]

Motiwala et al.

[11] Patent Number: 4,511,862

[45] Date of Patent: Apr. 16, 1985

[54] PROGRAMMABLE MULTITONE DPSK MODULATOR

[75] Inventors: M. Arif Motiwala, Fairport; Jack L. Sutherland, Rochester, both of N.Y.

[73] Assignee: Harris Corporation, Melbourne, Fla.

[21] Appl. No.: 435,467

[22] Filed: Oct. 20, 1982

[51] Int. Cl.[3] .............................................. H03C 3/00

[52] U.S. Cl. .................................. 332/16 R; 375/54; 375/67

[58] Field of Search ................ 332/16 R; 375/52, 53, 375/54, 67

[56] References Cited

U.S. PATENT DOCUMENTS 3,617,941 11/1971 DeLellis .......................... 332/16 R

*Primary Examiner*—Eugene R. Laroche
*Assistant Examiner*—Robert J. Pascal
*Attorney, Agent, or Firm*—L. Lawton Rogers, III; Joseph M. Killeen

[57] ABSTRACT

A multitone DPSK modulator produces a composite analog signal in which the phases of the tones included within the composite analog signal represent data. The modulator uses digital circuitry to synthesize a plurality of analog tones simultaneously. On a periodic basis, input digital data controls the amount by which the phase of each of the component tones is shifted. Synthesis is accomplished by periodically retrieving signals from a sine table and applying the retrieved signals to a D/A converter. A composite analog signal is sythesized by summing a retrieved signal from the sine table for each of the component tones during each sampling period. The number of tones included within the composite analog signal and the frequency, amplitude and starting phases of each of the component tones may be programmed and thus readily changed.

16 Claims, 3 Drawing Figures

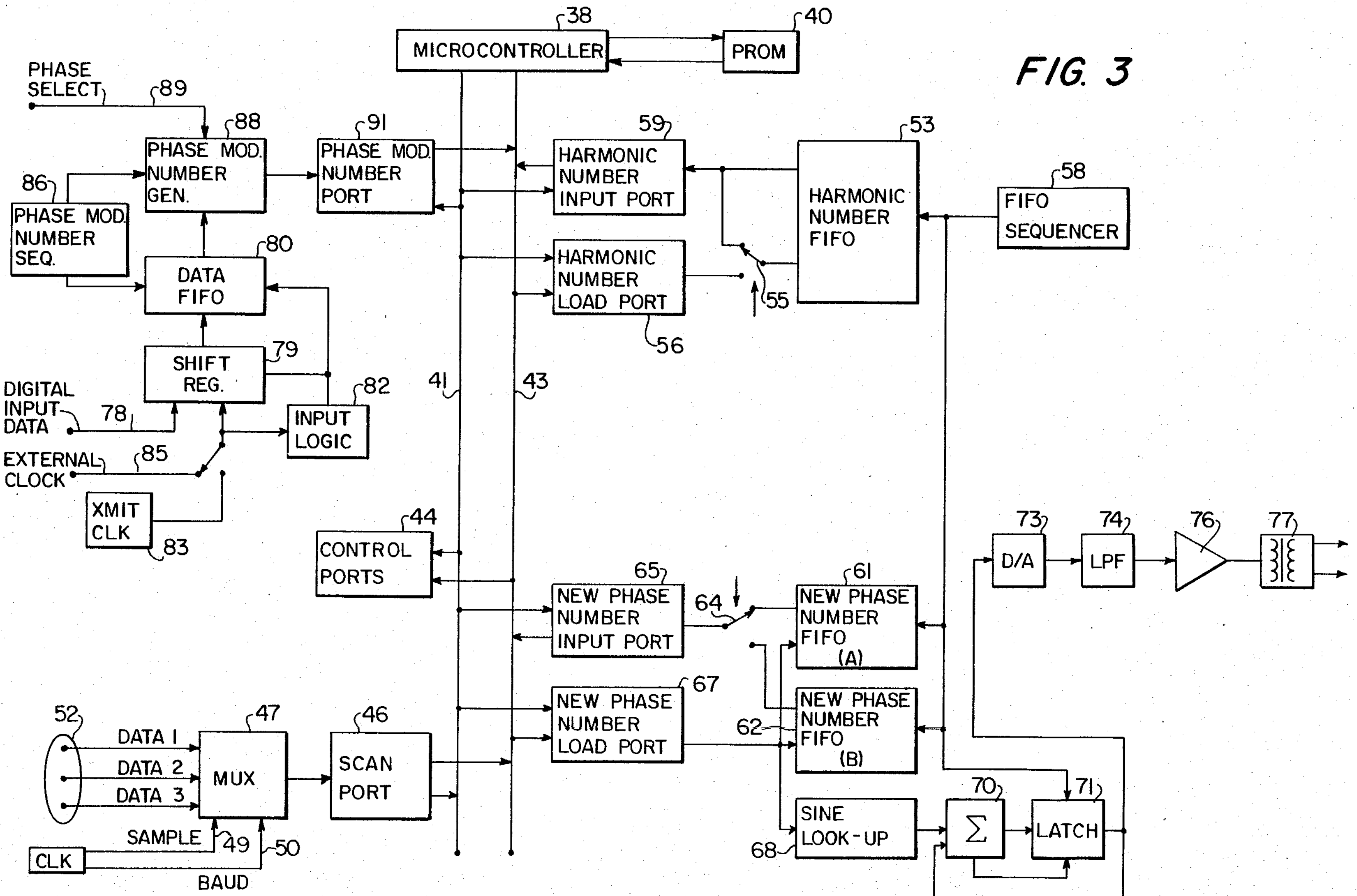
FIG. 3
MICROCONTROLLER
PROM
PHASE SELECT
PHASE MOD. NUMBER GEN.
PHASE MOD. NUMBER PORT
HARMONIC NUMBER INPUT PORT
HARMONIC NUMBER FIFO
FIFO SEQUENCER
PHASE MOD. NUMBER SEQ.
DATA FIFO
HARMONIC NUMBER LOAD PORT
SHIFT REG.
DIGITAL INPUT DATA
INPUT LOGIC
EXTERNAL CLOCK
XMIT CLK
CONTROL PORTS
D/A
LPF
NEW PHASE NUMBER INPUT PORT
NEW PHASE NUMBER FIFO (A)
NEW PHASE NUMBER LOAD PORT
NEW PHASE NUMBER FIFO (B)
DATA 1
DATA 2
DATA 3
MUX
SCAN PORT
SINE LOOK-UP
LATCH
SAMPLE
CLK
BAUD

PROGRAMMABLE MULTITONE DPSK MODULATOR

BACKGROUND OF THE INVENTION

The present invention relates to a method and apparatus for producing a composite analog signal containing a plurality of tones wherein the phase of each tone represents data. More particularly, it relates to a multitone differentially encoded phase shift keyed (DPSK) modulator in which the frequency, amplitude and starting phase of each of the tones are programmable.

In phase shift keyed signal communication, a binary signal is transmitted by selectively changing the phase of a carrier signal by one of two predetermined phase shifts. In a receiver responsive to phase shift keyed signals, a demodulator is used to determine which of the two phase shifts occurred and thus which data bit (zero or one) was sent.

In differentially encoded phase shift keyed (DPSK) signal communication, data bits are taken one, two or more at a time and are represented in the transmission as one of a plurality of predetermined phase shifts in a carrier signal. The phase shifting is performed at predetermined intervals, often called the baud interval. For multitone DPSK communications, multiple carrier frequencies (or tones) are modulated by the binary data and the composite of these tones is transmitted. Multitone DPSK receivers recover the binary data by detecting the multiple carrier frequencies and then measuring the phase change, if any, in each of the carrier frequencies at the appropriate baud interval.

Digital multitone DPSK modulators are known in which each of the carrier frequencies is generated from a memory unit in which is stored a plurality of signals representing the amplitude of a single cycle of a sinusoidal function. A tone is synthesized by addressing successive signals in the sinusoidal memory unit at a given sampling rate and producing an analog signal equal to that specified by the memory unit. The frequency of the synthesized tone depends upon the sampling rate and the increments by which the sinusoidal memory unit is addressed. For a given sampling rate, the lowest (or "fundamental") frequency is synthesized by using single increments through the memory unit. Harmonics of the fundamental frequency are synthesized by incrementing through the memory in multiple increments. For example, the $n^{th}$ harmonic is generated by addressing every $n^{th}$ signal in the sinusoidal memory unit. Composite tones are simultaneously synthesized by summing the samples of each of the component tones during each sample period. This sum represents one output sample of the composite signal.

For digital multitone DPSK modulation, the synthesized tones are phased shifted once during each baud interval. The amount of such phase shift of each tone represents a predetermined number and value of input digital data bits. Generally, in order to provide for detection and discrimination at the receiver/demodulator, there are a plurality of sample intervals for each baud interval.

One problem with current digital multitone DPSK modulators is that, once built, the composition of the composite signal is not readily varied. Thus, in current DPSK modulators such as those disclosed in U.S. Pat. No. 4,270,208 to DeLellis the number of tones included in the composite analog signal, and the frequencies and starting phases of each of the tones are fixed. Such modulators can communicate only with receivers built to detect the identical number of tones, and the identical frequencies and starting phases of each of the tones.

Another similar problem with current digital multitone DPSK modulators is the difficulty encountered in changing the subset of harmonics of the fundamental frequency which is generated. Such limitations reduce the usefulness of conventional modulators because of their inability to communicate except with receivers made to respond to the identical tone libraries.

It is therefore an object of the present invention to obviate many of the problems associated with known systems and to provide a novel method and a digital input data responsive multitone DPSK signal generator.

It is another object of the present invention to provide a novel method and apparatus for generating a multitone DPSK signal in which the amplitude, frequency and starting phases of each of the tones can be independently programmed.

It is a further object of the present invention to provide a novel method and apparatus for generating a multitone DPSK signal in which the number of tones included within the composite signal can be independently programmed.

It is yet another object of the present invention to provide a novel method and apparatus for generating a multitone DPSK signal in which the frequencies of the component tones may be changed simply by the selection of an appropriate sample clock rate.

It is yet a further object of the present invention to provide a novel method and apparatus for synthesizing a composite multitone analog signal.

It is still another object of the present invention to provide a novel method and multitone DPSK modulator which is simple, flexible, and relatively inexpensive.

These and other objects and advantages of the present invention will become apparent to one skilled in the art from the claims and from a perusal of the following detailed description when read in conjunction with the attached drawings.

BRIEF DESCRIPTION OF THE DRAWINGS

FIG. 3 is a more detailed functional block diagram of the multitone DPSK modulator illustrated in FIG. 1.

DETAILED DESCRIPTION

Figure 1:
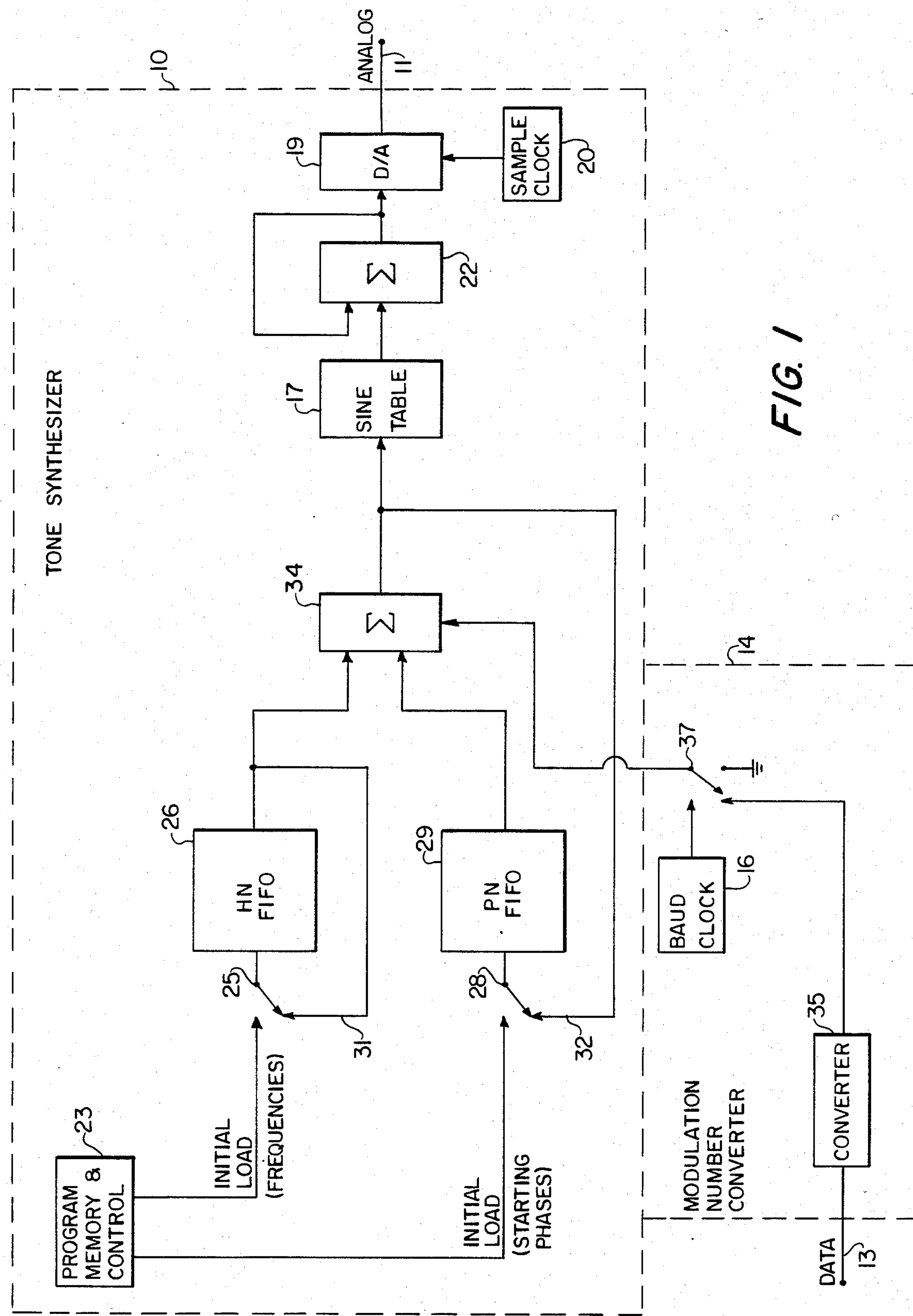
FIG. 1 is a functional block diagram of one embodiment of the multitone DPSK modulator of the present invention.

One embodiment of the multitone DPSK modulator of the present invention is shown in the functional block diagram of FIG. 1. As shown in the figure, the modulator includes a digital tone synthesizer 10 which provides a composite analog signal at an output terminal 11. The output signal is comprised of a plurality of tones, each tone having a programmable frequency, amplitude and starting phase. An input digital data signal is applied via input terminal 13 to a modulation number converter 14 which successively converts a selected predetermined plurality of input digital data bits into a phase modulation number. The phase modulation numbers are provided to the tone synthesizer 10 at a predetermined rate controlled by a baud clock 16 within the modulation number converter 14.

With continued reference to FIG. 1, signals representing the harmonic tones to be included in the composite signal may be contained in a program memory 23. These signals, called harmonic numbers, represent both the harmonic tone to be included in the composite analog output signal and the size of the increment needed in a sine table 17 hereinafter described to synthesize that harmonic tone. For example, a harmonic number of 4 indicates that the fourth harmonic of the fundamental tone is to be included in the composite analog signal and that this harmonic is synthesized by extracting every fourth signal from the sine table 17 at the predetermined sampling rate.

Prior to or upon the initiation of a synthesis operation, the program memory 23 is connected by way of a switch 25 with a harmonic number first-in first-out memory ("HN FIFO") 26. At that time, a plurality of harmonic numbers representing the harmonic tones to be included in the composite analog output signal may be loaded from the program memory 23 into the HN FIFO 26.

Prior to or upon the initiation of a synthesis operation, the program memory 23 may also be connected with a phase number first-in, first-out memory ("PN FIFO") 29 by way of a switch 28. At that time, a plurality of signals representing the starting phase of each harmonic tone included in the composite analog signal may be loaded from the program memory 23 to the PN FIFO 29.

These signals represent the starting phase by indicating the position of the angle of the starting phase within the sine table 17. For example, if the sine table has 120 entries (one for each three integer degrees 0 through 359) and if the starting phase of a particular tone were 36 degrees, a signal representing the number 12 (36 divided by 3) would be loaded from the program memory 23 to the PN FIFO 29 into the position corresponding to that tone within the plurality of signals loaded.

Once the HN FIFO 26 and PN FIFO 29 have been loaded, the switches 25 and 28 may be reset to the feedback position as hereinafter described.

The output signals from the HN FIFO 26 and the PN FIFO 29 are applied to an accumulator 34 to which is also applied the output signal from the modulation number converter 14. The output signal from the HN FIFO 26 is also fed back to the input thereof via switch 25. The output signal from the accumulator 34 is applied to the input terminal of the PN FIFO 29 by way of switch 28 and to the sine table 17.

The sine table 17 is connected to a second accumulator 22 and the output signal therefrom fed back to the input thereof and applied through a digital to analog ("D/A") converter 19 to the output terminal 11 of the tone synthesizer 10 under control of a sample clock 20.

With continued reference to FIG. 1, the modulation number converter 14 includes a converter 35, a two position switch 37 and the baud clock 16 operative to selectively connect the input terminal of the accumulator 34 of the tone synthesizer 10 to the converter 35 and a source of ground potential.

Each of the components illustrated in FIG. 1 may be any suitable conventional component capable of performing the indicated functions.

In operation and with continued reference to FIG. 1, synthesis of a composite analog signal is accomplished by generating a sample of each harmonic tone to be included in the composite and summing all of the samples to obtain a sample of the composite signal at each cycle of the sample clock 20. During each cycle of the sample clock 20, the harmonic number from the HN FIFO 26 for each tone is added to the phase number from the PN FIFO 29 for that tone. Since the harmonic number represents the amount by which the phase of the tone changes during each sample period, the addition in the accumulator 34 of the harmonic number to the phase number (which initially contains the starting phase) identifies the total phase of the tone after one sampling period. This total phase number is fed back from the accumulator 34 into the PN FIFO 29 by means of a feedback path 32 and switch 28 and replaces the starting phase in the PN FIFO 29. Thus, during each sample period, the PN FIFO 29 is updated to contain a plurality of phase number signals representing the total phase of each tone. The addition in the accumulator 34 of the harmonic number from the HN FIFO 26 to the old total phase number provides a new total phase number. Whenever the total phase of a tone exceeds the number of entries in the sine table 17, the total phase is reduced by the number of entries in the sine table 17 and thus by a 360 degree rotation of the total phase.

For example, for the $n^{th}$ harmonic tone, if the phase number at sample $mt_s$ equals T, the phase number at sample $(m+1)t_s$ equals (T+n). In other words, the phase number for the next sample period, equals the phase number for the current period plus the harmonic number, i.e., the amount of phase change experienced during the next sample.

During each cycle of the sample clock 20, both the HN FIFO 26 and the PN FIFO 29 circulate in correspondence with each other so that the harmonic number and the phase number of a particular tone are applied to the accumulator 34 at the same time. The accumulator 34 adds the harmonic number and phase number for each tone and applies it to the sine table 17 where a signal representing the amplitude of the sinusoidal function at the phase represented by the added signal is generated.

By way of explanation, the sine table 17 contains a plurality of values representing amplitudes of a single cycle of a sinusoid. A single tone may be generated by periodically retrieving the next signal from the sine table 17 and applying the retrieved signal to the D/A converter 19. By retrieving every $n^{th}$ signal from the sine table 17 on the same periodic basis, the $n^{th}$ harmonic of the lowest (or "fundamental") frequency is generated.

A signal which is the composite of all the desired harmonics can be generated by adding in accumulator 22, the retrieved signals for each of the harmonics during each cycle of the sample clock 20. Thus, while the current sample of the composite analog output signal is provided by the D/A converter 19, all the signals for the next composite sample are being added in the accumulator 22.

Figure 2:
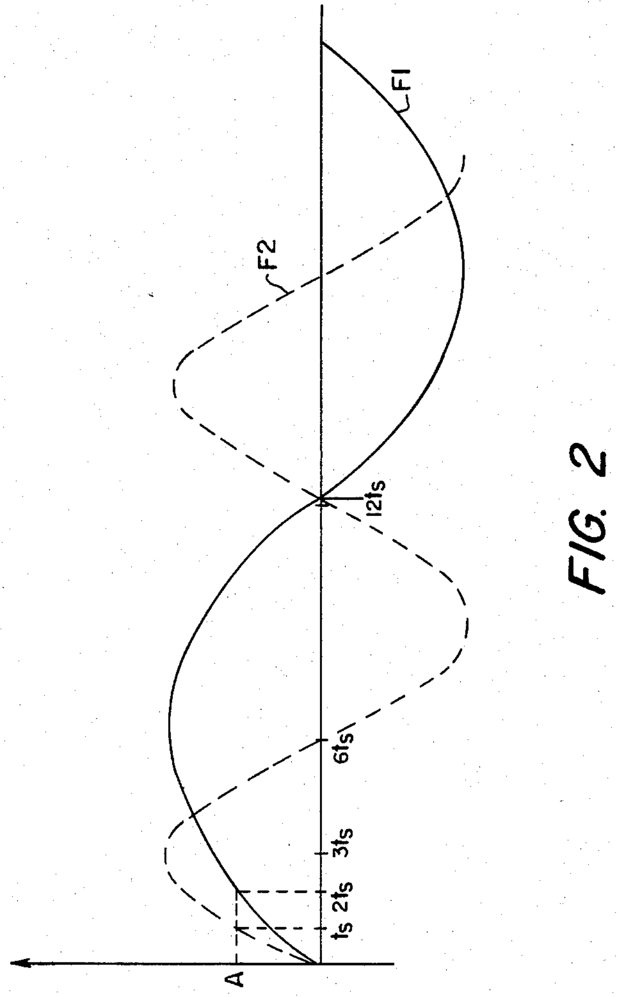
FIG. 2 is a timing diagram illustrating the relationship among harmonic frequencies in the modulator of FIG. 1.

The operation of the sine table may be more readily understood with reference to FIG. 2 which depicts two sinusoids, F1 and F2, where the frequency of F2 is twice that of F1. In other words, F2 is the second harmonic of F1. In the continuous time domain, sinusoid F1 can be expressed as:

$$X(t) = A \sin(kw_0 t + \theta) \quad (1)$$

Where

A = the maximum amplitude k = the harmonic number of a fundamental frequency $w_o$=the fundamental angular frequency in radians per second $\theta$=the initial phase shift When the waveform is synthesized by a sampling technique, then the sampled form can be expressed as:

$$x_k(nt_s)=A \sin [k2\pi(f_s/N)nt_s+\theta] \quad (2)$$

Where

N=total number of cycles of samples in one complete cycle of a fundamental n=sampling time index $f_s$=sampling rate $t_s$=sample interval ($1/f_s$)

By substituting $f_k$ for the product $kf_s/N$:

$$x_k(t)=A \sin [2\pi f_k t+\theta] \quad (3)$$

Thus, the amplitude of the $n^{th}$ harmonic at sample time, t, is the same as the amplitude of the fundamental at sample time, nt. With this relationship among harmonic frequencies, only one set of sinusoidal values is needed. The amplitude of the fundamental tone or any of its harmonics can be obtained by stepping through the fundamental sinusoid table at the sample rate for the fundamental frequency and at n times the sample rate for the $n^{th}$ harmonic.

FIG. 2 depicts this relationship among harmonics. During the time interval, $t_s$, sinusoid F2 (the 2nd harmonic of F1) has achieved the same amplitude A which the fundamental will achieve in a $2t_s$ time interval. Thus, a table which contains the amplitudes of F1 at the end of each sampling period, $t_s$, can also be used to synthesize the sinusoid F2 by extracting every 2nd value of the table for each sampling period.

With reference again to FIG. 1, the output signal from the sine table 17 is applied to the second accumulator 22 which sums the sine table 17 output signals for each of the tones during one cycle of the sample clock 20. During one cycle of the sample clock 20 the sine table 17 will provide one signal from each of the tones. Upon the start of the next cycle of the sample clock 20, the signal accumulated in accumulator 22 is loaded into the D/A converter 19 and the accumulator 22 is cleared. The D/A converter 19 produces an analog signal which is proportional to the number represented by the accumulated signal. The analog signal is a composite of the plurality of tones whose frequencies and starting phases were specified in the initial load of the HN FIFO 26 and PN FIFO 29.

As the tone synthesizer 10 continues to operate, the phase of each of the tones of the composite analog signal will vary as a sinusoid of the specified frequency. To operate as a DPSK modulator, the phases of the tones are changed other than sinusoidally. By changing the phases of the tones by predetermined amounts, the phase changes can be used to represent data. In the present invention, the digital input data signal applied via input terminal 13 to the modulation number converter 35 provides a predetermined modulation number signal in response to a plurality of bits in the digital input data signal. For example, if the modulation number converter 35 is set to operate on two bits at a time, it will produce one of four possible modulation signals in response to each successive two bit signal. These four possible modulation signals represent four predetermined phase shifts.

At a predetermined rate, often called the "baud rate," the phases of the component tones of the analog signal are shifted by one of the predetermined shifts in response to the digital input data signal. Once during each cycle of the baud clock 16, switch 37 connects the converter 35 to the accumulator 34. The switch 37 remains in this state for only one cycle of the sample clock 20.

While the converter 35 is connected to the accumulator 34, successive bits of input digital data signal are converted to a plurality of modulation number signals representing phase shifts. One modulation number signal is generated for each tone in the composite analog signal and it is added in the accumulator 34 to the signal from the HN FIFO 26 and the PN FIFO 29, and to the signal from the HN FIFO 26 (as required in some modulation schemes). The inclusion of the modulation number signal in the output signal from the accumulator 34 causes a phase shift in a component tone. Thus, digital input data signals are phase modulated at the baud rate into the composite analog signal. For example, if the modulation number converter 35 is set to convert two bits at a time and if there are 39 tones in the composite analog signal, 78 bits of digital input data are converted and modulated during each cycle of the baud clock 16.

A more detailed functional block diagram is illustrated in FIG. 3 in the form of a high frequency (HF) modem modulator. The circuit of FIG. 3 includes a microcontroller 38 and an associated programmable-read-only-memory ("PROM") 40. The PROM 40 contains all the instructions needed to control the operation of the logic circuit and may contain both the harmonic numbers and starting phase numbers. The microcontroller 38 communicates with and controls the other devices in the circuit in a conventional manner by use of two 8-bit buses 41, 43 and the control ports 44.

The microcontroller 38 responds to signals detected at a scan port 46. The scan port 46, through use of a multiplexor ("MUX") 47, scans the various input lines for the presence of a signal. Input lines connect to a sample clock 49, a baud clock 50, and various control and data lines 52. The input lines enable the control and data lines 52 to communicate with the microcontroller 38 in order to select operating modes and to specify data. When a signal is detected from either the sample clock 49 or the baud clock 50, the microcontroller 38 executes the series of instructions internally associated with each signal to control the operation of the circuit.

With continued reference to FIG. 3, a harmonic number FIFO 53 is used to store and circulate the harmonic numbers during transmission. At the beginning of each transmission, switch 55 connects the harmonic number FIFO 53 to a harmonic number load port 56. The microcontroller 38 loads the harmonic numbers into the harmonic number FIFO 53 via one of the buses 41, 43, the harmonic number load port 56 and the switch 55. Upon completion of the initial loading of the harmonic number FIFO 53, switch 55 is utilized to feed the harmonic numbers from the output terminals of the harmonic number FIFO 53 back to the input terminals thereof thus continuously circulating the harmonic numbers under control of a FIFO sequencer 58. These harmonic numbers are made available to the remainder of the circuit by a harmonic number input port 59.

With continued reference to FIG. 3, a phase number circuit provides storage of the phase number from the previous cycle of the sample clock 49 and access to the phase number. Two phase number FIFO's 61, 62 are used to store the phase numbers from two different sampling periods. A switch 64 may be used to determine which new phase number FIFO 61, 62 is used at a particular time. The new phase number is made available to the remainder of the circuitry through a phase number input port 65.

At the beginning of each transmission, the microcontroller 38 sends the starting phase numbers to the phase number FIFO's 61, 62 via one of the buses 41, 43 and a phase number load port 67.

For each sample period during transmission, the microcontroller 38 adds the harmonic numbers from the harmonic number FIFO 53 to the corresponding phase numbers from one of the phase number FIFO's 61, 62 to obtain the phase number for the next sample period, applies the phase number to a sine table 68 to obtain the component tone sample and applies the component tone samples to an accumulator 70 to obtain the composite sample. After the composite sample has been obtained, it is latched into latch 71 which drives a digital-to-analog converter 73 to produce a composite analog signal. The resultant composite analog signal is filtered by a low pass filter 74 to smooth the transitions in the waveform, is amplified by a level adjust amplifier 76, and is transformer-coupled by a transformer 77 into the transmission medium as the output signal.

The use of alternative phase number FIFO's, 61, 62 permits a variety of modulation standards to be satisfied in a single embodiment. For example, in one standard of operation, the phase modulation numbers are added with respect to the phase numbers of each tone at the end of the previous baud period. In another mode of operation, the same embodiment can produce a signal in which the phase modulation numbers are added with respect to the phase numbers at the beginning of the baud period just completed. For example, in the latter mode of operation, one of the two phase number FIFO's can be used to save the set of phase numbers produced during the first sample of the baud period while the other is used to save the current set of phase numbers during the remainder of the baud period.

Within each sample period, accumulator 70 generates a composite number which includes amplitude contributions from all tones. To eliminate overflow and corresponding loss of accuracy, accumulator 70 can be constructed to contain larger numbers than are generated by sine table 68. In this way, in the event that many of the samples of the component tones are at an amplitude near the maximum, the accumulator 70 can nonetheless obtain the sum of these component samples without overflow.

With continued reference to FIG. 3, digital input data to be transmitted enters the circuit by a shift register 79 and is temporarily stored in a data FIFO 80. The input process is controlled by input logic 82 and is timed by means of an internal transmit clock 83 or an external clock 85. The digital input data arrive in a serial fashion and are stored in the data FIFO 80 until used for the modulation process.

Once during each baud interval, a phase modulation number sequencer 86 controls the movement of the digital input data from the data FIFO 80 to a phase modulation number generator 88. The phase modulation number generator 88 converts a plurality of digital input data bits into predetermined phase modulation numbers. A phase select line 89 controls the number of digital input data bits which are converted for each phase modulation number. For example, in bi-phase operation, one bit of the digital input data determines which of two possible phase modulation numbers are generated; in quad-phase operation, two bits determine which of four possible phase modulation numbers. The generated phase modulation numbers are made available to the remainder of the circuitry through a phase modulation number port 91.

Modulation is accomplished by including the phase modulation numbers in the summation of the harmonic numbers and the phase numbers by the microcontroller 38 during the first sample period of each baud period. In this way the digital input data control the phase shift of each tone of the composite analog signal.

ADVANTAGES AND SCOPE OF THE INVENTION

The present method for synthesizing a multitone composite analog signal is programmable in frequency, amplitude and the starting phase of each of the component tones. In a preferred embodiment, a composite analog signal is generated in which digital input data have been modulated using a DPSK technique. However, the invention is not limited to such an environment and can be utilized wherever a tone or tones are synthesized using digital circuitry.

It will be apparent from the preceding description that the present invention provides numerous advantages with respect to prior art DPSK modulators, particularly those which are used with multitone digital synthesis.

For example, the frequencies of the tones which comprise the composite analog signal are programmable and not fixed until the initiation of a transmission. Thus, the number and frequencies of the harmonic tones can be readily changed to suit varying demands.

Likewise, the starting phase of the tones which comprise the composite analog signal is programmable and is not fixed until the initiation of a transmission. Again, this feature allows the apparatus to be easily set up to minimize high peak to average ratios, which will in turn allow an increase in total average power.

Furthermore, the amplitude of individual tones which comprise the composite analog signal is programmable, by loading tone harmonic numbers in multiple locations of the respective FIFO memories.

The invention is capable of using bi-phase, quad-phase, or any similar conversion scheme to convert serial digital input data to phase modulation numbers without affecting the remainder of the apparatus. The capability further enhances the invention's ability to communicate with a wide variety of DPSK modulation devices.

The synthesis of the composite analog signal and the modulation of digital input data are not dependent on the size of a particular device. Thus, specific embodiments of the present invention can use storage devices sized as needed for the number of tones in the specific composite analog signal, and not for the needs of the method.

The present invention may be embodied in other specific forms without departing from the spirit or essential characteristics thereof. The presently disclosed embodiment is therefor considered in all respects to be illustrative and not restrictive. The scope of the invention is indicated by the appended claims rather than the foregoing description, and all modifications which come within the scope of the claims when accorded a broad range of equivalency are therefore intended to be embraced therein.

What is claimed is:

1. A method of generating a composite analog signal containing a plurality of tones, each of the tones being a different harmonic of the same predetermined frequency, and each of the tones having a programmable frequency, amplitude and phase wherein the phase represents data, comprising the steps of:
(a) providing first and second memories;
(b) loading a plurality of digital harmonic numbers into the first memory, each of the digital harmonic numbers corresponding to a harmonic of a predetermined frequency and representing a tone;
(c) loading a plurality of digital phase numbers into the second memory, each of the phase numbers corresponding to the starting phase of one of the tones;
(d) providing a digital data signal;
(e) converting one or more bits of the digital data signal into a phase modulation number for each of the tones;
(f) summing for each tone the phase number with the harmonic number and with the phase modulation number to provide a phase number;
(g) circulating the phase numbers through the second memory;
(h) circulating the harmonic numbers through the first memory;
(i) providing a third memory containing sinusoidal values;
(j) retrieving a sinusoidal value related to each phase number in response to the circulation of each of the phase numbers through the second memory;
(k) summing the retrieved sinusoidal values for each of the phase numbers to provide a composite digital signal; and
(l) converting the composite digital signal into a composite analog signal.

2. The method of claim 1 wherein said phase modulation number is summed with the phase number and harmonic number only at predetermined intervals.

3. The method of claim 1 including the further step of adjusting the phase number to a value within a predetermined range of values.

4. Apparatus for generating a composite analog signal containing a plurality of tones, each of the tones being a different harmonic of the same predetermined frequency and each of the tones having a programmable frequency, amplitude and phase, wherein the phase represents data, comprising:
(a) first storage means;
(b) second storage means;
(c) first converting means responsive to a digital data signal to provide a plurality of phase modulation numbers;
(d) control means for loading a plurality of digital harmonic numbers into said first storage means, for loading a plurality of phase numbers into said second storage means, for summing the numbers at the output terminals of said first storage means with the numbers at the output terminals of said second storage means and with the numbers advanced through said first converting means to provide a plurality of summation numbers, for circulating said summation numbers through said second storage means, and for circulating the digital harmonic numbers through said first storage means in synchronism with the circulation of the summation numbers;
(e) memory means responsive to said control means for generating a plurality of digital sinusoidal signals each representing a sinusoidal value;
(f) summing means for summing said plurality of digital sinusoidal signals over a predetermined time period to thereby provide a composite digital signal; and
(g) second converting means responsive to said summing means for producing a composite analog signal.

5. The apparatus of claim 4 wherein said control means includes means for inhibiting the summing of the number advanced through said first converting means during predetermined time intervals.

6. The apparatus of claim 4 wherein first converting means is responsive to a plurality of digital data signals to provide a plurality of phase modulation numbers.

7. The apparatus of claim 4 further including means for adjusting the value of said digital composite signals to within a a predetermined range of values.

8. A method for synthesizing a composite analog signal containing a plurality of tones, each of the tones having a programmable frequency, amplitude and phase, comprising the steps of:
(a) providing first and second memories;
(b) loading a plurality of digital harmonic numbers into a first memory, each of said digital harmonic numbers corresponding to a harmonic of a programmable frequency and representing a tone;
(c) loading a plurality of digital phase numbers into a second memory, each of said phase numbers corresponding to a programmable starting phase of one of the tones;
(d) summing the phase number for each tone to the harmonic number for such tone to provide a phase number for each tone;
(e) circulating the digital harmonic numbers through the first memory;
(f) circulating the summed phase numbers through the second memory in synchronization with the circulation of the harmonic numbers through the first memory;
(g) providing a third memory containing sinusoidal values for each of the phase numbers under an address corresponding to a predetermined harmonic;
(h) retrieving a sinusoidal value for each of the tones;
(i) summing the retrieved sinusoidal values for all of the tones to provide a composite digital signal; and
(j) converting the composite digital signal to a composite analog signal corresponding in frequency, amplitude and phase to the programmed numbers.

9. A means for synthesizing a composite analog signal containing a plurality of tones, each of the tones having a programmable frequency, amplitude and phase comprising:
(a) first storage means;
(b) second storage means;
(c) control means for loading a plurality of digital harmonic numbers into said first storage means, for loading a plurality of phase numbers into said second storage means, for summing the numbers at the output terminals of said first storage means with the numbers at the output terminals of said second storage means to provide a plurality of summation numbers, for circulating said summation numbers through said second storage means, and for circulating the digital harmonic numbers through said first storage means in synchronism with circulation of said summation numbers;

(d) memory means responsive to said control means to generate a plurality of digital signals each representing a sinusoidal value;

(e) summing means to sum said plurality of digital signals over a predetermined time period to thereby provide a composite digital signal; and (f) second converting means responsive to said summing means for producing a composite analog signal containing a plurality of tones and corresponding in frequency, amplitude and phase to the programmed numbers.

10. A method of performing differential phase shift-keyed (DPSK) modulation to generate a composite analog signal which is responsive to an input digital data signal and wherein said composite analog signal contains a plurality of tones, each tone having a predetermined frequency, amplitude and phase and each tone having a phase responsive to one or more bits of the input digital data signal, comprising the steps of:

(a) converting one or more bits of an input digital data signal into phase modulation numbers for each tone;

(b) synthesizing a composite analog signal by the method of claim 8; and (c) modulating said composite analog signal by including said phase modulation numbers in the phase number for each tone.

11. A means of performing differential phase shift-keyed (DPSK) modulation to generate a composite analog signal which is responsive to an input digital data signal and wherein said composite analog signal contains a plurality of tones, each tone having a predetermined frequency, amplitude and phase and each tone having a phase responsive to one or more bits of the input digital data signal, comprising:

(a) converting means responsive to an input digital data signal and producing phase modulation numbers in response thereto; and (b) means as set out in claim 9 for synthesizing a composite analog signal; and (c) control means for modulating said composite analog signal by including said phase modulation numbers in the phase number for each tone.

12. The generating apparatus of claim 4 further including means for programming the frequency of each of the tones by loading a plurality of numbers representing frequencies into a memory at or before the start of a generating sequence.

13. The generating apparatus of claim 4 further including means of programming the starting phase of each of the tones by loading a plurality of numbers representing starting phases into a memory at or before the start of a generating sequence.

14. The generating method of claim 1 further including a method for altering the amplitude of each of the tones by changing only the sinusoidal values for each of the phase numbers.

15. The generating apparatus of claim 4 further including means for programming the number of tones included in the composite analog signal by loading a plurality of numbers representing frequencies and a plurality of numbers representing starting phases at or before the start of a generating sequence.

16. The generating apparatus of claim 4 wherein a single summing apparatus is utilized to incorporate the harmonic number, the phase number and the phase modulation number for each tone.

* * * * *